United States Patent [19]
Sato

[11] 4,044,233
[45] Aug. 23, 1977

[54] END PREDICTOR FOR CASSETTE TAPE

[75] Inventor: Masaaki Sato, Hachioji, Japan

[73] Assignee: Olympus Optical Co., Ltd., Tokyo, Japan

[21] Appl. No.: 690,539

[22] Filed: May 27, 1976

[30] Foreign Application Priority Data

| | | |
|---|---|---|
| June 5, 1975 | Japan | 50-68024 |
| June 10, 1975 | Japan | 50-69968 |
| June 10, 1975 | Japan | 50-69969 |
| Sept. 10, 1975 | Japan | 50-109732 |

[51] Int. Cl.² .............................................. G06M 3/02
[52] U.S. Cl. .......................... 235/92 PE; 235/92 DN; 235/92 R; 360/137; 242/191
[58] Field of Search ............ 235/92 PE, 92 DN, 103, 235/132 A, 132 E; 33/137 R; 242/191; 360/74, 137, 96

[56] References Cited

U.S. PATENT DOCUMENTS

| | | | |
|---|---|---|---|
| 3,449,733 | 6/1969 | Berquist | 360/137 |
| 3,687,397 | 8/1972 | Suzuki et al. | 235/103 |
| 3,770,281 | 11/1973 | Walburn | 360/137 |
| 3,834,648 | 9/1974 | Rose et al. | 235/92 DN |
| 3,872,509 | 3/1975 | Yoshii | 360/137 |
| 3,921,215 | 11/1975 | Asami | 360/74 |
| 3,946,437 | 3/1976 | Ono | 360/137 |

*Primary Examiner*—Joseph M. Thesz
*Attorney, Agent, or Firm*—Ostrolenk, Faber, Gerb & Soffen

[57] ABSTRACT

An end predictor is provided for use with a tape cassette of the type which contains a measured length of tape corresponding to a given number of turns on one of the tape hubs mounted therein when the tape is entirely wound on one of the hubs, exclusive of its leader portion extending to the other hub. A tape cassette of this type is indicated by an indication aperture formed in the cassette. When such cassettte is mounted in a tape recorder, the end predictor operates to count the number of revolutions of either take-up shaft or rewind shaft on which the respective tape hubs are mounted, thereby providing an alarm when a predetermined count is reached. Thus a prediction is provided of a terminal end of the cassette tape at a given time interval before the terminal end is actually reached. The detection of the indication aperture is effective to reset a counter arrangement which is associated with a record/playback operation of the recorder.

4 Claims, 9 Drawing Figures

END PREDICTOR FOR CASSETTE TAPE

BACKGROUND OF THE INVENTION

The invention relates to a tape end predictor for use with a cassette tape recorder which is operative to indicate beforehand a terminal end of a running tape being approached.

A variety of techniques and means are known for detecting a terminal end of a tape in conventional tape recorders. However, with known arrangements, at the time when the terminal end of the tape is reached and indicated by an alarm, there is no length of the tape which is available to the recording since either the leader or trailer portion having no magnetic coating thereon is then running across the associated magnetic head. This results in an interruption in the recording operation, which cannot be avoided since it takes a time which is at least one minute to replace another tape cassette in response to the alarm. Therefore, it is highly desirable to minimize the time length during which a recording operation is interrupted in order to avoid a serious loss of significant information.

SUMMARY OF THE INVENTION

It is a principal object of the invention to provide an end predictor for cassette tape which is adapted for use with a tape cassette of the type which contains a measured length of tape corresponding to a given number of turns on one of the tape hubs mounted therein when the tape is entirely wound on said one hub so that the predictor is capable of counting the number of revolutions of a shaft on which said one tape hub is mounted and producing an alarm when a predetermined count is reached, thus predicting the terminal end of a cassette tape at a given time interval before the terminal end is actually reached.

It is another object of the invention to provide a tape cassette of the type mentioned above which is provided with an indication aperture indicative of the type of such cassette so as to make it distinguishable from tape cassettes of other types, thus enabling the counting and alarming operation only in response to the detection of such indication aperture.

It is a further object of the invention to provide a counter arrangement which is adapted to be reset when a tape cassette having the indication aperture is mounted in a tape recorder and a record/playback operation is actuated.

When recording the content of a lecture, conference or the like with the tape recorder, recording is seldom initiated from an intermediate position of the tape, but is almost always initiated from the beginning of the tape. In consideration of this fact, the length of a recordable tape which is contained in the cassette is previously controlled in accordance with the invention, and the number of revolutions of one of the tape hubs on which it is received is counted to determine a timing interval for prediction. Generally, a time period required for the complete reciprocal running of a cassette tape is fixed, so that the time required for a given position of the tape to be reached can be detected by counting the number of revolutions of the tape hub if the tape length remains constant. By way of example, with a cassette tape requiring 60 minutes for a reciprocal running, the number of revolutions of the tape hub or a time length required to achieve a given number of revolutions can be readily calculated, thus enabling a control over the time length in accordance with the number of revolutions. In this manner, a desired time interval can be determined by counting the number of revolutions of the tape hub or a shaft, either take-up shaft or rewind shaft, on which it is mounted. In accordance with the invention, the number of revolutions of the tape hub is counted from the beginning of the tape in order to detect a given time, for example, one minute, before the terminal end of the tape is reached.

DETAILED DESCRIPTION OF PREFERRED EMBODIMENTS

Figure 1:
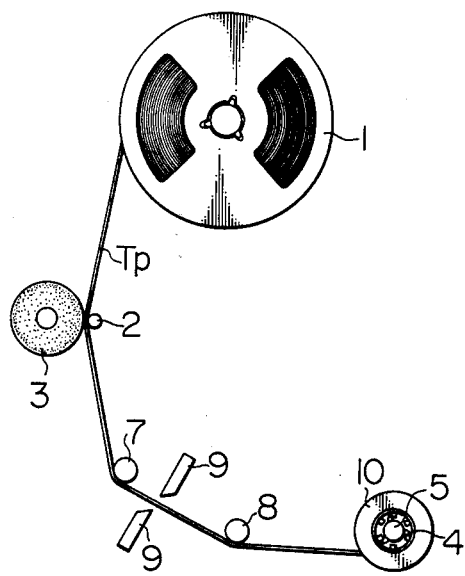
FIG. 1 is a plan view of one example of a mechanism for winding a length of tape onto a tape hub which is to be received in a cassette.

Referring to FIG. 1, there is shown one example of a mechanism for winding a tape Tp onto a tape hub which is to form part of a tape cassette. A fresh, unrecorded length of tape Tp is stored on a tape reel 1, which may be a reel of No. 8 size, for example, and the leading end of the tape is passed between a capstan 2 and a pinch roller 3 to be taken up on a cassette tape hub 4. A winding shaft 5 which drives the tape hub 4 for rotation is connected with a motor, not shown, and is driven with a torque which approaches the tape running speed of a tape recorder, not shown, such as the tape speed during a playback, fast forward running or rewind operation.

Intermediate the capstan 2 and the tape hub 4, there is provided a tape cutter 9 which serves to cut the tape Tp as it is held taut between a pair of tape guides 7, 8. In the usual practice, such mechanism is operated in a manner such that the number of revolutions of the capstan 2 is counted by a counter, now shown, and when a predetermined count is reached, the motor driving the winding shaft 5 is deenergized and a brake (not shown) is energized to stop the motor rapidly in order to cut the tape Tp by the cutter 9, thus allowing a given length of tape to be wound on the tape hub 4. However, in accordance with the invention, the tape length is controlled by counting the number of revolutions of the winding shaft 5 rather than that of the capstan 2 so as to supply an accurately measured length of tape onto that hub 4.

Figure 2:
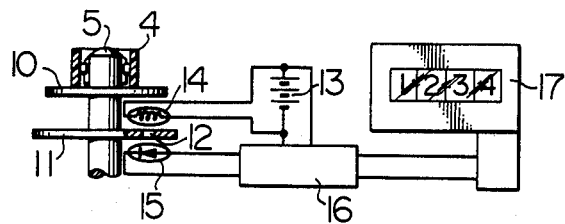
FIG. 2 is a side elevation of one embodiment of a winding station which is used to count the number of turns of the tape on the tape hub.

Referring to FIG. 2, the winding station comprises the winding shaft 5 on which is fixedly mounted a hub disc 10 for receiving the tape hub 4. Another disc 11 is fixedly mounted on the winding shaft 5 at a position below the hub disc 10 and is formed with at least one small opening 12. A small lamp 14 and a light receiving element 15, such as a photoelectric transducer element or phototransistor, are disposed in vertical alignment on the opposite sides of the disc 11 so as to be aligned with a path of the movement of the opening 12. The lamp 14 is connected across a power source 13. As the winding shaft 5 rotates to cause a rotation of the disc 11, each passage of the opening 12 through the space between the lamp 14 and the element 15 produces an electric current through the element 15. In this manner, pulses are produced in a number corresponding to the number of revolutions of the winding shaft 5 and the number of openings 12 formed in the disc 11. The pulses are amplified by an amplifier 16 before being applied to an electromagnetic counter 17. If a single opening 12 is provided, one pulse will be produced for each revolution of the winding shaft 5, thus increasing the count of the counter 17 by one.

Figure 3:
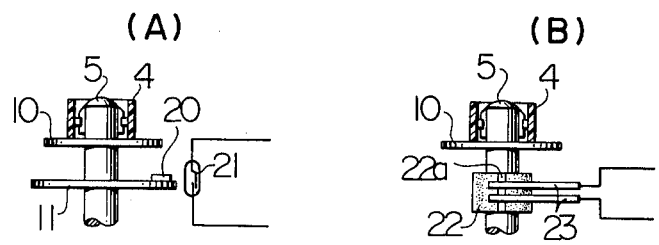
FIGS. 3A and B are side elevations of other embodiments of the winding station.

FIG. 3A shows an alternative arrangement in which a magnet 20 is fixedly mounted on the disc 11 and a reed switch 21 is disposed adjacent to the periphery of the disc so that they cooperatively produce a pulse. FIG. 3B shows a further alternative arrangement in which the disc 11 is replaced by a non-conductive sleeve 22a having an electrically conductive layer 22 applied around part of its periphery, which may be engaged by a pair of conductive brushes 23 for producing a pulse.

Figure 4:
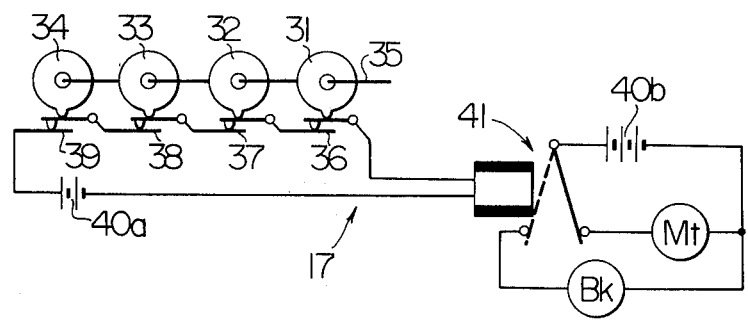
FIG. 4 is a schematic wiring diagram of a counter arrangement which is utilized to count the number of turns on the tape hub.

As shown in FIGS. 2 and 4, the counter 17 includes a plurality of combinations of cams and switches for each digit, which are arranged such that a plurality of normally opened switches 36 to 39 may be selectively closed by associated rotary cams 31 to 34, respectively, only when a particular numeral appears on each digit. Specifically, the cams 31 to 34 are mounted on a rotating shaft 35 together with numeral wheels for the one's, ten's, hundred's and thousand's digits, while the switches 36 to 39 are connected in series. All of the switches 36 to 39 may be closed only when a particular combination of numerals, for example, 1, 2, 3 and 4 is achieved, to energize a relay 41 from a power source 40a. It should be understood that the mechanism including the cams and switches of the electromagnetic counter 17 may be provided separately from the housing of the counter.

In the above example, when the number of revolutions of the winding shaft 5 reaches a given value, or 1234 revolutions in the present example, as a length of tape is being wound on the tape hub, all of the switches 36 to 39 are closed to energize the relay 41, whereupon a motor Mt is disconnected from a power source 40b while a brake Bk is energized, thus rapidly stopping the tape running. The tape Tp may now be cut by the cutter 9, thus completing a winding operation with a measured length of tape being taken up on the tape hub 4. It will be understood that the electromagnetic counter 17 may be replaced by an electronic counter.

Figure 5:
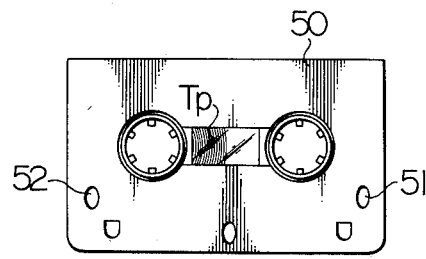
FIG. 5 is a top view of a tape cassette which contains a measured length of tape.

In order to permit a distinction of a tape cassette which contains a measured length of tape Tp from other tape cassettes, FIG. 5 shows a tape cassette 50 which is formed with a pair of indication apertures 51, 52 which are located adjacent to the both lateral edges thereof and which extend through the cassette. These indication apertures permit the end predictor to be activated when the tape cassette 50 is mounted in a tape recorder.

While the number of turns of the tape Tp on the tape hub 4 remains constant, the number of turns may vary slightly depending on the mode of operation of the tape recorder such as a fast forward running, rewind or playback operation because of differential winding torques. However, such variation in the number of turns remains less than 0.5% at most, which represents only 0.15 minute variation for a tape which plays 30 minutes in one direction, so that such variation has no significant influence upon the effect of the prediction of the tape end which is made in accordance with the invention at a time on the order of one minute or more prior to the actual tape end.

Figure 6:
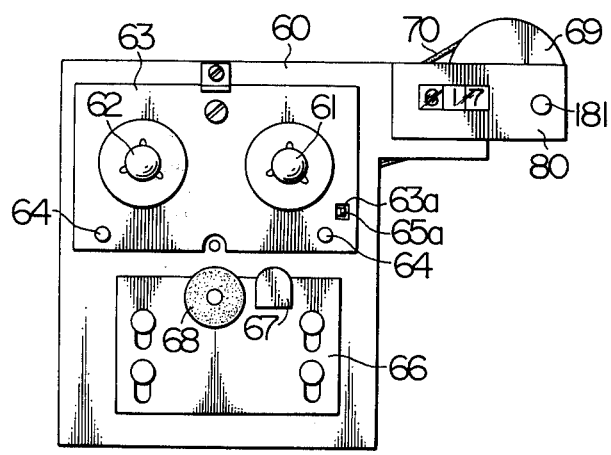
FIG. 6 is a plan view of one exemplary tape recorder which is provided with the end predictor for cassette tape which is constructed according to the invention.

FIG. 6 shows one embodiment of the end predictor according to the invention which as adapted for use with a tape cassette of the type mentioned above. In FIG. 6, a tape recorder is shown without a tape cassette being mounted therein. The tape recorder includes a chassis 60 in which a cassette receiving chamber is defined by a bottom cover 63, through which a tape feed shaft 61 and a tape take-up shaft 62 extend for engagement with delivery and take-up hubs, not shown, of a tape cassette when it is mounted in the chamber. At a position aligned with one of the indication apertures 51, 52 formed in the cassette 50, the bottom cover 63 is formed with an opening 63a through which projects one end 65a of a cassette detecting lever 65 (see FIG. 7) which will be described later.

Figure 7:
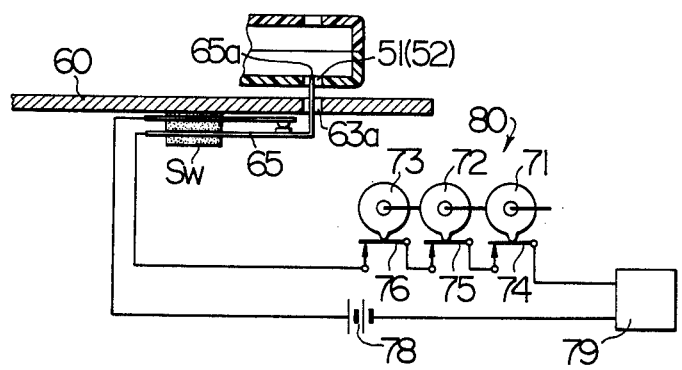
FIG. 7 is a side elevation of parts of the end predictor shown in FIG. 6.

As is conventional, a sliding plate 66 carrying a pinch roller 68, a record/playback head 67 and the like is slidably mounted on the chassis 60. A counter 80 is mounted on the chassis 60 toward its upper end, and includes a counter shaft, not shown, which is rotated by engagement with the tape delivery shaft 61 through a belt 70 and a pulley 69 so as to count the number of revolutions of the tape hub which is engaged with the delivery shaft 61. The counter 80 is associated with a pushbutton 181 which serves as the means for resetting the counter to zero. The construction of the counter 80 is shown in FIG. 7, and in the embodiment shown, it includes three digit wheels. However, it should be understood that the number of digit wheels may be increased or decreased. A plurality of rotary cams 71 to 73 corresponding to each digit are mounted on the counter shaft together with digit wheels, and cooperate with a plurality of normally open switches 74 to 76 to close them when a particular combination of numerals or digits (i.e. when a particular "count") is attained. The switches are connected in series as in the previous arrangement.

The detecting lever 65 is mounted on the underside of the chassis 60 of the tape recorder, and its intermediate portion forms a movable contact of a normally closed switch Sw while its free end 65a is disposed so as to be capable of detecting the presence or absence of the indication apertures 51, 52. Specifically, when the loaded cassette 50 includes the indication aperture 51,52 as shown in FIG. 7, the free end 65a moves into the indication aperture 51, 52 to close the switch Sw since the detecting lever 65 is resiliently urged in the upward direction so as to form a movable contact. In the absence of the indication aperture 51, 52, the bottom surface of the cassette mounted prevents an upward movement of the free end 65a, whereby the detecting lever 65 is held in its lower position in which the switch Sw remains open. The electrical circuit associated with the counter arrangement comprises a power source 78, the switch Sw, the normally open switches 74 to 76, and an alarm 79. A current flow occurs through the alarm 79 only when all of the switches are closed.

In operation, the cassette 50 of the type mentioned is mounted on the tape recorder, whereupon the switch Sw becomes closed. A count is preset in the counter 80 which corresponds to a particular number of revolutions of the take-up shaft which it attains at a given time interval before the terminal end of the tape is reached. In the example shown, such count is shown in the window of counter 80 (FIG. 6) as 617. Thus, the switches 76 to 74 are closed by the respective cams 73 to 71 only when this count is reached in the counter 80, thereby operating the alarm 79. The prediction of the tape end as produced by the alarm 79 alerts an operator of the tape recorder that it is now one minute before the terminal end of the tape is reached. The count 617 represents a number of revolutions of the tape delivery shaft 61 (see FIG. 6). It will be appreciated that the count preset in the counter may be arbitrarily changed to choose any desired time interval that the alarm is generated before the terminal end of the tape is actually reached. The alarm 79 may comprise an electromagnetic buzzer or a loudspeaker of the tape recorder.

Figure 8:
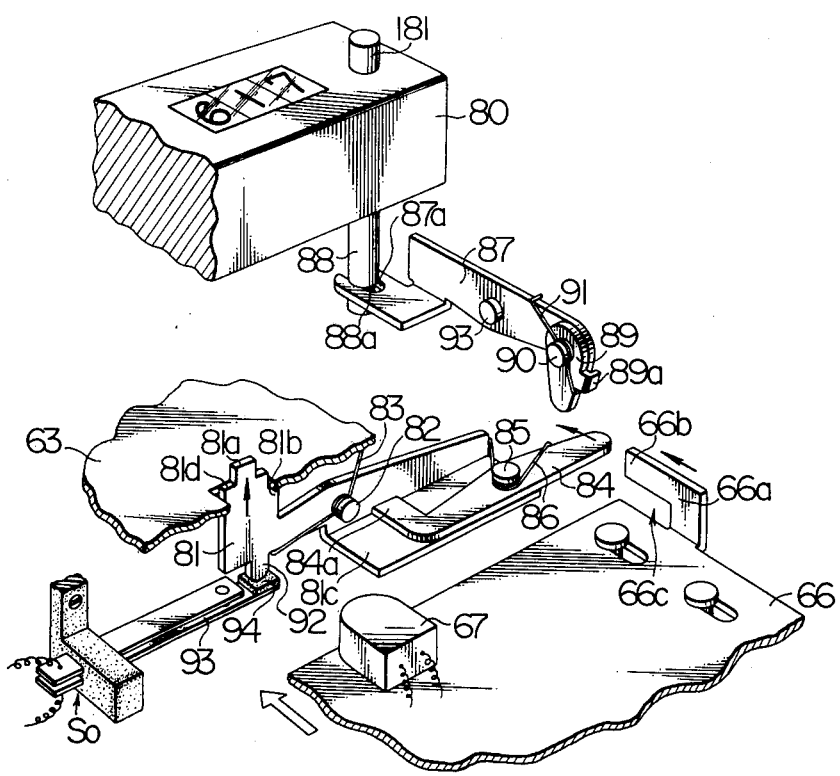
FIG. 8 is an exploded, perspective view of one embodiment of a resetting assembly according to the invention.

Referring to FIG. 8, there is shown an apparatus for resetting the counter to zero in response to the detection of an indication aperture in the tape cassette mounted as a record/playback actuating member of the tape recorder has moved to its operative position. In the description to follow, the counter is assumed to be counting in the forward or increasing direction, but it should be understood that a counter counting in the reverse or decreasing direction may be employed.

Referring to FIG. 8, a detection lever 81 is pivotally mounted on a pivot 82 which is secured to the chassis 60 (see FIG. 6) and is urged to rotate clockwise by a spring 83 which is disposed on the pivot 82 and have one end engaged with one arm of the lever 81. At the end of one arm, the lever 81 is provided with an upright portion which is formed with a step 81b, which serves as a means for limiting the rotation of the lever 81 by abutment against the bottom surface of the bottom cover 63 (see FIG. 6) of the cassette receiving chamber defined in a tape recorder. Beyond the step 81b, the lever 81 is formed with a free end 81a which serves as a detecting piece. The other arm of the lever 81 has a lower portion 81c which is bent at right angles and on which an operating lever 84 is pivotally mounted on a pivot 85. The lever 84 is urged to rotate clockwise about the pivot 82 by a spring 86 which is disposed thereon. However, such rotation of the lever 84 is limited by the abutment of one end 84a thereof against the other arm of the detecting lever 81. The operating lever 84 is adapted to be driven by an upright portion 66a formed along one lateral edge of the slidable plate 66 which carries the magnetic head 67, the pinch roller and the like. Specifically, when the slidable plate 66 is moved in the direction indicated by an arrow in order to establish a record/playback mode of operation of the tape recorder, the free end 66b of upright portion 66a bears against the operating lever 84 to cause it to rock counter-clockwise about the pivot 85, whereupon the lever engages the arcuate lower periphery of a pivotable member 89.

On the other hand, a reset lever 87 is pivotally mounted on a pivot 93 which is secured to the chassis 60 (see FIG. 6), and its forwardly extending arm has a lower extension which is bent at right angles and which is formed with a fork 87a in its forward end. The fork 87a loosely fits in a peripheral groove 88a formed in the lower end of a resetting shaft 88 of the tape counter 80. As is well known, the resetting shaft 88 is normally urged upward by a spring and stop mechanism, not shown, and when it is moved down, the counter is reset to zero.

The pivotable member 89 is pivotally mounted on a pivot 90 which is secured to the end of the other arm of the resetting lever 87, and is urged to rotate clockwise by a spring 91. However, such rotation of the pivotable member 89 under the resilience of the spring 91 is normally constrained by the abutment against the other arm of the lever 87 of a detent piece 89a which extends from the pivotable member 89. The pivotable member 89 is oblong in configuration and its lower end can be engaged by said other arm of the lever 84.

The upright portion 66a which is formed along the lateral edge of the slidable plate 66 at a position nearer the counter 80 is key-shaped, thereby defining a pusher piece 66b which is separated from the slidable plate by a recess 66c. When the operating lever 84 is level with the upright portion 66a, it is rocked counter-clockwise about the pivot 85 by the end 66b of upright portion 66a as the slidable plate 66 is moved in the direction of the arrow. However, when the operating lever 84 is level with the recess 66c, a sliding movement of the slidable plate 66 in the direction of the arrow cannot displace the operating lever 84. Similarly, a displacement of the operating lever 84 in response to a sliding movement of the slidable plate 66 cannot occur when the operating lever 84 is located above the pusher piece 66b of the upright portion 66a.

The detecting lever 81 is formed with a switch actuating tab 92 which extends downwardly in the opposite direction from the upright portion thereof to bear against an insulating pad 94 which is applied to the free end of a movable contact 93 of a normally closed switch $S_0$ which is suitably secured to the chassis 60 and which corresponds to the switch Sw shown in FIG. 7. When a tape cassette devoid of an indication aperture is mounted on the tape recorder and its bottom surface prevents an upward movement of the upright portion 81a of the lever 81, the tab 92 depresses the movable contact 93 downwardly, thus opening the switch $S_0$. However, when the tape cassette 50 (see FIG. 7) which is formed with the indication apertures is mounted in the cassette chamber, the bottom surface of the tape cassette 50 will bear against the step 81b of the detecting lever 81 to depress it in the downward direction by an amount which is insufficient to move the movable contact away from the mating contact, and therefore the switch $S_0$ remains closed.

The resetting device of the invention as constructed in the manner mentioned above operates as follows: When a tape cassette is not mounted, the detecting lever 81 has its step 81b in bearing engagement against the lower surface of the bottom cover 63 of the cassette receiving chamber under the action of the spring 83. Under this condition, the operating lever 84 which is pivotally mounted on the end of the other arm of the detecting lever 81 is loated opposite to the recess 66c which is formed below the pusher piece 66b of the upright portion 66a of the slidable plate 66, so that when the slidable plate 66 moves in the direction of the arrow to establish a record/playback mode of operation, the operating lever 84 cannot be displaced since it is located to be received within the recess 66c. As a result, the reset lever 87 is not operated and the counter 80 cannot be reset to zero.

When a tape cassette of the type mentioned is mounted, the detecting piece 81a at one end of the detecting lever 81 moves into the indication aperture 51 or 52 (see FIG. 5 or 7) until the step 81d bears against the bottom surface of the cassette, whereupon it is slightly depressed against the action of the spring 83 to raise the operating lever 84, which is mounted on the other end of the lever, to a position which is substantially level with the pusher piece 66b of the upright portion 66a of the slidable plate. When the slidable plate 66 is moved in the direction of the arrow to establish a record/playback mode of operation, the pusher piece 66b engages and drives the adjacent edge of the operating lever 84 to turn it in a direction indicated by an arrow against the resilience of the spring 86. A resulting rocking motion of the operating lever 84 causes the end of said other arm thereof to engage the arcuate portion at the lower end of the pivotable member 89, thus raising it upward. As a consequence, the adjacent end of the reset lever 87 which is coupled with the pivotable member 89 is also raised, rocking counterclockwise about the pivot 93, whereby the fork 87a formed at the opposite end thereof is moved down to carry the reset shaft 88 also in the downward direction as a result of a loose fitting with the peripheral groove 88a formed in the latter, thus resetting the counter 80 to zero. As the operating lever 84 continues to be pushed by the pusher piece 66b to move past the lowermost end of the arcuate portion of the pivotable member 89, there occurs no further movement of the pivotable member 89 in the upward direction. Conversely, as a result of the resilience applied to the reset shaft 88 which tends to move it upward, the reset lever 87 is urged to rotate in the clockwise direction to restore the pivotable member 89 to its original position, and the resetting button 181 also assumes its normal position in which it projects upward from the top surface of the counter 80.

In this manner, the counter 80 is automatically reset to zero, making it to start a counting operation from zero. When the slidable plate 66 moves from its operative to its stop position in the opposite direction from that indicated by the arrow after the terminal end of the tape is reached to terminate the record/playback operation, the operating lever 84 will be released from engagement with the pusher piece 66b as the slidable plate 66 moves, then rotating clockwise about the pivot 85 under the resilience of the spring 86 to bear against the lower end face of the pivotable member 89 to cause it to rotate counter-clockwise about the pivot 89 against the resilience of a weak spring 91 disposed thereon. As the operating lever 84 continues to move past the lowermost end of the pivotable member 89, the pivotable member 89 becomes free to rotate clockwise under the bias applied thereto, returning to its initial position by engaging the detent portion 89a thereof with the other arm of the reset lever 87.

When a tape cassette devoid of an indication aperture 51 or 52 (see FIG. 5) is mounted which is not of the type mentioned above, the detecting piece 81a of the detecting lever 81 bears against the bottom surface of the loaded tape cassette whereby it is depressed to a position level with the upper surface of the bottom cover 63 of the cassette receiving chamber. As it is depressed, the detecting lever 81 rocks counter-clockwise about the pivot 82 through an increased angle against the resilience applied by the spring 83, whereby the operating lever 84 is raised through an increased stroke in the upward direction until it is located above the upper edge face of the upright portion 66a of the slidable plate 66. As a consequence, when the slidable plate 66 moves in the direction of the arrow, the pusher piece 66b merely moves below the operating lever 84 without engagement therewith, thus preventing a displacement of the operating lever 84 and hence preventing a resetting of the counter to zero, in the similar manner as when the tape cassette of the type described is not mounted in the recorder.

From the foregoing description, it will be understood that a mere mounting of the tape cassette results in a positive detection of the type of tape cassette loaded and also enables an automatic resetting of the counter to zero as a record/playback mode of operation of the tape recorder is established if the tape cassette loaded is of the type described.

In the embodiment described above, the counter has been assumed as initiating its counting operation beginning with zero, but it should be understood that the counter may initiate its counting operation from a preset value and terminate the counting operation at zero. As will be evident from the illustration of FIG. 8 and the associated description given above, a counting operation is only effective or activated in the arrangement of FIG. 8 when the tape cassette loaded is provided with the indication aperture.

What is claimed is:

1. A tape end predictor for a tape cassette of a tape recorder, the cassette being of a type which contains a measured length of tape corresponding to a given number of turns thereof on one of the tape hubs which are mounted in a cassette when the tape is entirely received on said one tape hub, the tape cassette of the type being provided with an indication aperture indicative of the type of cassette, the predictor comprising a counter for counting the number of revolutions of a shaft on which said one tape hub is mounted to thereby indicate the length of tape reeled off the one tape hub, alarm means responsive to a given count in the counter to close an electrical circuit, thereby providing an alarm, a detection lever disposed for detecting the presence of the indication aperture in the cassette mounted on the tape recorder, and a reset lever operatively associated with an operating lever which is carried by the detection lever and adapted to reset the counter, a movement of a record/playback actuating member of the tape recorder to its operative position being effective, when a tape cassette having the indication aperture is mounted on the tape recorder, to reset the counter through the operating lever and the reset lever, said alarm means providing an alarm when a given count is reached in the counter, thereby predicting the tape end at a given time interval before the tape end is actually reached.

2. A tape end predictor according to claim 1 in which the operating lever is enabled to engage the record/playback actuating member and the reset lever to reset the counter only when the tape cassette having the indication aperture is mounted on the tape recorder.

3. A tape end predictor according to claim 1 in which the reset lever is operative in the operative position of the record/playback actuating member and remains inoperative in the inoperative position of the latter.

4. A tape end predictor for a tape cassette of a tape recorder, the cassette being of a type which contains a measured length of tape correesponding to a given number of turns thereof on one of the tape hubs which are mounted in a cassette when the tape is entirely received on said one tape hub:

a tape cassette of the type described being provided with an indication aperture so as to be distinguishable from tape cassettes of other types;

the predictor comprising a counter for counting the number of revolutions of a shaft on which said one tape hub is mounted to thereby indicate the length of tape reeled off said one tape hub;

alarm means responsive to a particular count in the counter to close an electrical circuit, thereby providing an alarm to predict the tape end at a given time interval before the tape end is actually reached;

a detection lever which is operative, when a tape cassette devoid of said indication aperture is mounted on the tape recorder, to disable the electrical circuit associated with the alarm means.

* * * * *